June 9, 1959

J. MORRIS 2,889,711

HAMMER

Filed Aug. 22, 1955

INVENTOR.
JOSEPH MORRIS

BY HIS ATTORNEYS.
HARRIS, KIECH, FOSTER & HARRIS

June 9, 1959  J. MORRIS  2,889,711
HAMMER
Filed Aug. 22, 1955  2 Sheets-Sheet 2

INVENTOR.
JOSEPH MORRIS

BY HIS ATTORNEYS.
HARRIS, KIECH, FOSTER & HARRIS

United States Patent Office 2,889,711
Patented June 9, 1959

2,889,711

HAMMER

Joseph Morris, Los Angeles, Calif.

Application August 22, 1955, Serial No. 529,815

4 Claims. (Cl. 74—22)

The present invention relates in general to a mechanical rotary hammer for simultaneously reciprocating and continuously rotating a wide variety of tools, such as drills, riveting heads, and the like. While not limited thereto, the present invention finds particular utility in the drilling of rock, or similar materials, the hammering action applied to a drill by the invention, coupled with the rotary motion imparted to the drill thereby, resulting in extremely high drilling rates in such materials.

More particularly, the present invention contemplates a mechanical hammer which includes a stationary cam member and a movable cam member rotatable about and reciprocable along the axis of the cam members, and which includes interengageable cam elements carried by the two cam members for moving the movable cam member axially periodically in response to rotation thereof, the tool being connected to the movable cam member so that it is simultaneously reciprocated and rotated. Still more particularly, the invention contemplates stationary and movable cam members having opposed faces carrying interengageable cam elements for periodically displacing the movable cam member axially to produce the desired hammering of the tool connected to this cam member, the opposed cam faces preferably being transverse cam faces generally perpendicular to the axis of rotation of the movable cam member. The movable cam member is rotated by a driving means which extends through the stationary cam member and which is keyed to the movable cam member by keying means for transmitting rotation of the driving means to the movable cam member while permitting axial displacement of the movable cam member relative to the driving means.

An important object of the invention is to provide interengageable cam elements on the cam members which axially displace the movable cam member periodically in manner to produce sharp, hammering blows at the tool connected to the movable cam member.

Another object is to provide a hammering means wherein the interengageable cam elements on the two cam faces are balls located exactly equal distances from the axis of rotation. By employing balls as the cam elements, sharp, hammering blows are produced, and by locating the balls exactly equal distances from the axis of rotation, no radial loads are applied to the movable cam member so as to minimize bearing loads, which is an important feature.

Another object is to provide a hammering means wherein the cam elements on at least one of the cam faces are radially arranged rollers.

Another object is to provide a hammering means wherein the cam elements on one of the cam faces are rollers arranged radially, and wherein the cam elements on the other of the cam faces are balls. With this construction, as the balls and rollers interengage to produce the desired hammering action, no side loads are applied to either the balls or the rollers, thereby preventing the development of radial loads on the bearings for the movable cam member due to the interengagement of the balls and rollers, which is an important feature of the invention.

Another object of the invention is to provide a construction wherein the cam elements on both cam faces are radially arranged rollers.

Still another object is to provide a hammering means wherein the cam elements on one of the cam members comprise inclined ramps and wherein the cam elements on the other of said cam members are balls, or rollers, rollable over the inclined ramps, each ramp ending abruptly at the beginning of the next ramp to cause the hammering means to produce sharp, hammering blows.

Another object is to provide a hammering means as described in the preceding paragraph wherein balls or rollers are located at the ends of the inclined ramps for engagement by the balls or rollers on the other cam member, a sharp, hammering blow being produced whenever the balls or rollers on such other cam member drop off the balls or rollers at the ends of the inclined ramps. With this construction the inclined ramps lead the balls or rollers on the other cam member upwardly over the balls or rollers at the ends of the ramps so as to avoid direct collisions between the balls or rollers of the two cam members to minimize wear, the hammering action occurring as the balls or rollers on the other cam member drop off the balls or rollers at the ends of the inclined ramps on the first cam member.

Another object is to provide a hammering means wherein the cam elements on one of the cam members are balls or rollers located various distances from the axis of the cam members and the cam elements on the other of the cam members are balls or rollers located approximately equal distances, respectively, from the axis of the cam members so that the various groups of balls or rollers on one of the cam members respectively engage the various groups of balls or rollers on the other of the cam members.

Another object is to provide adjustable means for varying the distance which a ball cam element projects from the cam face of the cam member which carries it, whereby to vary the extent of reciprocation of the movable cam member. A related object is to provide a cam member having a bore therein generally parallel to and spaced from the axis of the cam members, a ball in the bore, and an adjustable ball seat threaded into the bore for varying the extent that the ball projects from the bore.

The foregoing objects, advantages, features and results of the present invention, together with various other objects, advantages, features and results thereof which will be evident to those skilled in the art in the light of this specification, may be attained with the exemplary embodiments of the invention which are illustrated in the accompanying drawing and which are described in detail hereinafter. Referring to the drawings:

Fig. 1 is a longitudinal sectional view of a rotary mechanical hammer of the invention, the hammer parts being shown in axially displaced positions;

Figs. 2, 3 and 4 are transverse sectional views respectively taken along the arrowed lines 2—2, 3—3 and 4—4 of Fig. 1;

Figure 9:
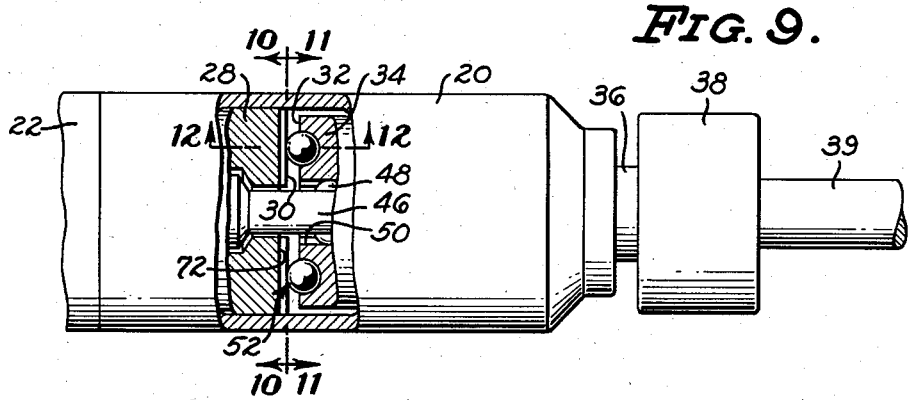
Fig. 9 is a view, partially in longitudinal section, of yet another embodiment of the invention.
Figure 10:
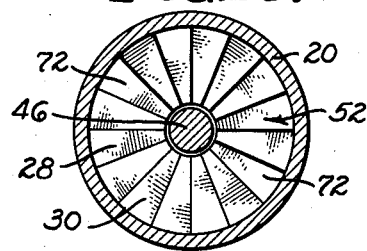
Figure 11:
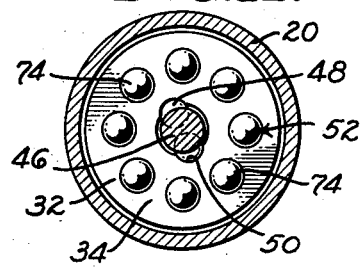
Figure 12:
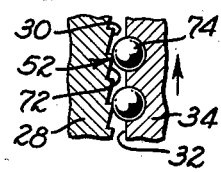
Figure 13:
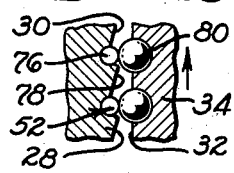
Figure 14:
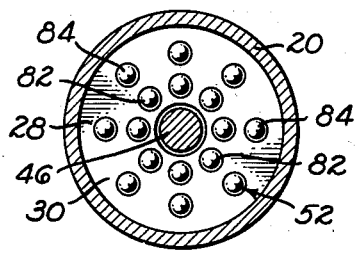
Figure 15:
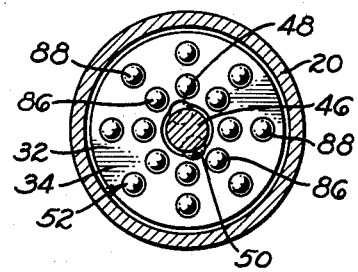
Figure 16:
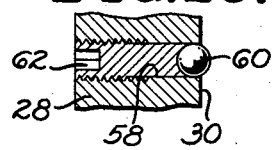

Figs. 10, 11 and 12 are sectional views respectively taken along the arrowed lines 10—10, 11—11 and 12—12 of Fig. 9;

Fig. 13 is a fragmentary view similar to Fig. 12, but illustrating a further embodiment of the invention;

Figs. 14 and 15 are transverse sectional views respectively similar to Figs. 10 and 11, but illustrating still another embodiment of the invention; and Fig. 16 is a fragmentary sectional view illustrating an adjustable seat for a ball cam element.

Throughout the drawings, the numeral 20 designates a housing of a mechanical hammer of the invention, which housing is shown as threaded on a supporting structure 22. This supporting structure may be a portion of the housing of an electric motor, for example, for driving the invention although any other suitable source of power may be utilized. A driving means 24, including a shaft 26, extends into the housing 20, the shaft 26 being the armature shaft of an electric motor, for example, Disposed within and connected to the housing 20, as by being threaded thereinto, is a stationary cam member 28 having a transverse face 30. Axially spaced from the face 30 is a transverse face 32 of a movable cam member 34, the latter including a shaft 36 which projects from the housing 20 and which carries a chuck 38 for the reception of a suitable tool 39, such as a drill. The shaft 36 is provided with recesses for balls 40 which engage a bearing 42 in the housing 20, the balls 40 permitting rotation of the movable cam member 34 and permitting reciprocation thereof along the axis of the cam members. A lubricant seal 44 is disposed outwardly of the bearing 42 to prevent the leakage of lubricant from the housing along the shaft 36.

The driving means 24 includes a shaft 46 which is suitably secured to the shaft 26, as by threading it thereon. The shaft 46 extends through the stationary cam member 28 into an axial recess in the movable cam member 34, and is provided with recesses for balls 48 which extend into grooves 50 in the side wall of the recess in the movable cam member. The balls 48 serve to key the movable cam member 34 to the driving shaft 46 to transmit rotation of the driving shaft to the movable cam member, while permitting reciprocatory movement of the movable cam member along the axis of the cam members.

Considering now the manner in which the movable cam member 34 is axially reciprocated in the embodiment of Figs. 1 to 4 of the drawings, the invention provides hammer means, designated generally by the numeral 52, for this purpose. The hammer means 52 includes a plurality of balls 54 spaced from the cam-member axis and respectively disposed in recesses in the face 30 of the stationary cam member 28, and includes a plurality of balls 56 spaced from the cam-member axis and disposed in recesses in the face 32 of the movable cam member 34, the balls 54 and 56 being circumferentially spaced about the cam-member axis. The balls 54 and the balls 56 are spaced radially from the cam-member exactly equal distances.

With the foregoing construction, as the movable cam member 34 is rotated, the balls 56 pass over the balls 54 to produce axial displacement of the movable cam member 34 toward the right, as viewed in the drawing. The movable cam member is returned to the left, as viewed in the drawing, by the load imposed on the outer end of the tool 39 carried by the chuck 38.

An important feature of the invention resulting from locating the balls 54 and 56 exactly equal distances from the cam-member axis is that no side loads are imposed on the bearing 42 or on the shaft 46.

In the particular construction illustrated, the balls 54 and 56 project from their respective recesses different distances and are of different diameters, the balls 56 being smaller than the balls 54 and projecting from their recesses greater distances than the balls 54. However, the balls 56 may be larger than the balls 54 and may project lesser distances, or the balls 54 and 56 may be of the same diameter and project equal distances, as desired.

Referring to Fig. 16 of the drawings, the stationary cam member 28 is therein shown as having a bore 58 therethrough which is generally parallel to the cam-member axis. Disposed in this bore is a ball 60 and threaded into the bore behind the ball is an adjustable ball seat 62 having an end engageable with the ball which is complementary to the ball. As will be apparent, the distance which the ball 60 projects beyond the cam face 32 may be varied to vary the extent of reciprocation of the movable cam member 34. The means shown in Fig. 16 for varying the extent to which a ball projects beyond one of the cam faces 30 and 32 may be incorporated in any of the embodiments herein disclosed utilizing balls as the cam elements.

Figure 1:
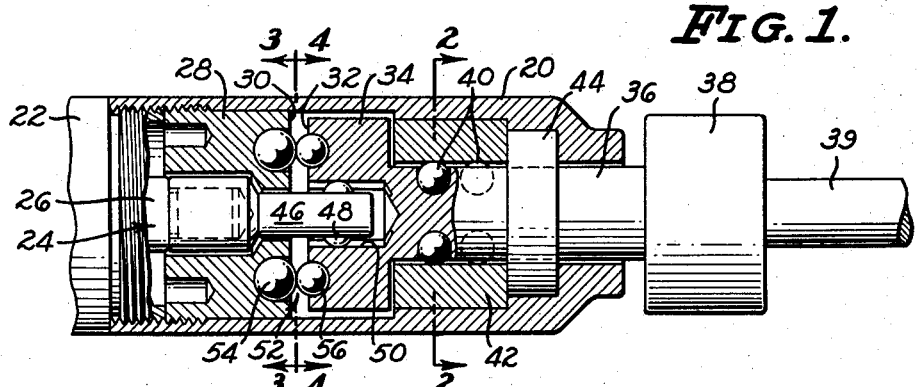
Figures 2, 3, 4:
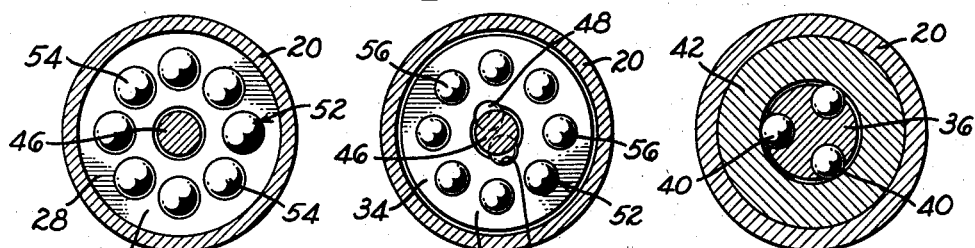
Figures 5, 6:
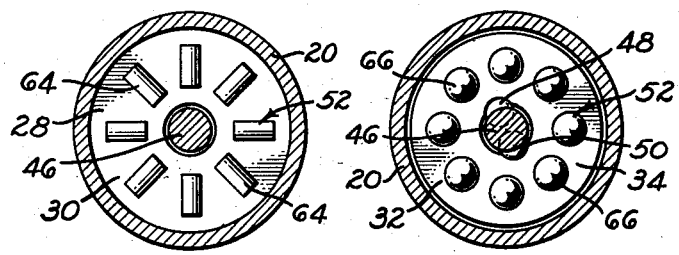
Figs. 5 and 6 are transverse sectional views respectively similar to Figs. 3 and 4, but illustrating another embodiment of the invention.

Turning now to the embodiment illustrated in Figs. 5 and 6 of the drawings, in this embodiment the hammer means 52 includes radial rollers 64 in recesses in the cam face 30 and the balls 66 in recesses in the cam face 32, it being understood that the balls may be in the cam face 30 and the rollers in the cam face 32 if desired. An important feature of this construction is that the interengaging balls and rollers impose no radial or side loads on the bearing 42 or the shaft 46, which is an important feature. It will be noted that this will be the case even if all of the rollers 64 and/or balls 66 are not located exactly the same distances from the cam-member axis. Consequently, this embodiment has the important advantage of permitting larger manufacturing tolerances.

Figures 7, 8:
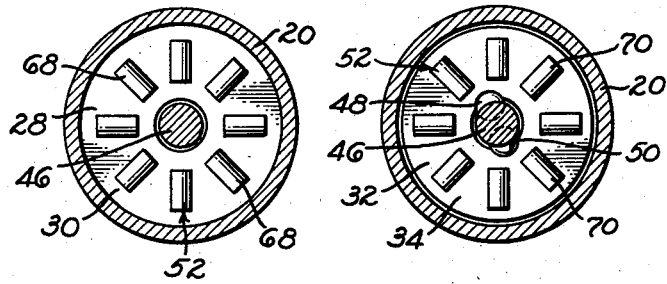
Figs. 7 and 8 are transverse sectional views respectively similar to Figs. 3 and 4, but illustrating still another embodiment of the invention.

The embodiment of Figs. 7 and 8 is similar to that of Figs. 5 and 6, except that the hammer means 52 includes rollers 68 and 70 in recesses in the cam faces 30 and 32, instead of rollers in one of the cam faces and balls in the other.

It will be understood that while cylindrical rollers have been shown in Figs. 5 to 8, tapered rollers may be utilized also.

In the embodiment of Figs. 9 to 12, one of the cam faces 30 and 32, e.g., the cam face 30, is radially serrated to provide radially extending, circumferentially spaced, inclined ramps 72, these ramps being inclined with respect to a plane perpendicular to the cam-member axis, as clearly indicated in Fig. 12. The other cam face, e.g., the cam face 32, is provided with balls 74 in recesses therein although rollers may be substituted for the balls. With this construction, the balls 74, or rollers, roll up the inclined ramps 72 and then suddenly drop off the ends of the ramps into engagement with the adjacent ramps. Consequently, there is only one impact blow per ramp, as compared with the two impact blows per ball or roller in the previously described embodiments. However, the ramps 72 may be spaced as closely as required to provide the desired number of impact blows per revolution of the movable cam member 34.

In the embodiment of Fig. 13, which is similar to that of Figs. 9 to 12, balls or rollers 76 are located at the ends of ramps 78 similar to the ramps 72, and are engaged by balls or rollers 80. In the particular construction shown, the balls or rollers 76 and the ramps 78 are on the cam face 30 and the balls or rollers 80 are on the cam face 32, but this may be reversed. With this construction, the balls or rollers 80 ride up the ramps 78 and over the balls or rollers 76, dropping off the balls or rollers 76 onto the next ramps 78 to provide an impact blow. This construction eliminates direct collisions between the balls or rollers 76 and the balls or rollers 80 to minimize wear, which is a feature of the invention. Again, the circumferential spacing may be such as to provide the desired number of impact blows per revolution of the movable cam member 34.

Considering the embodiment of Figs. 14 and 15, the cam face 30 is provided with balls 82 at one radial distance from the cam-member axis and with balls 84 at a greater radial distance from the axis, the cam face 32 being provided with inner and outer balls 86 and 88 located substantially the same distances from the axis as the inner and outer balls 82 and 84. In the particular construction illustrated, the various balls 82, 84, 86 and 88 are uniformly spaced circumferentially so that when one of the balls 86 engages one of the balls 82, one of the balls 88 simultaneously engages one of the balls 84 thereby spreading the load concentration to minimize wear. Preferably, the balls 82 and 86 are located exactly equal distances from the cam-member axis, the same being true of the balls 84 and 88, the purpose of this being to prevent side loads. While only two circumferential rows of balls have been shown in Figs. 14 and 15, the same concept may be extended to more than two circumferential rows, or the balls in the two cam faces 30 and 32 may be irregularly positioned in more or less random fashion if desired, various arrangements being possible.

With any of the hereinbefore-described embodiments, a large number of impact blows per revolution may be attained, and by rotating the movable cam member 34 at a relatively high speed, many thousands of impact blows per minute are attainable. For example, impact blows at rates in excess of 20,000 per minute may readily be produced with any of the embodiments disclosed. Impact blows applied to a drill, for example, at such rates, will cause the drill to penetrate even very hard rock, such as granite, at extremely high rates.

Although I have disclosed various exemplary embodiments of my invention herein for purposes of illustration, it will be understood that various changes, modifications and substitutions may be incorporated in such embodiments without departing from the spirit of the invention as defined by the claims hereinafter appearing.

I claim as my invention:

1. In a device for simultaneously reciprocating and continuously rotating a tool, the combination of: a housing; a stationary cam member carried by said housing; a movable cam member carried by said housing and adapted to have the tool connected thereto, said movable cam member being rotatable and reciprocable relative to said stationary cam member; means for rotating said movable cam member; and interengageable rotatable cam elements on said cam members for reciprocating said movable cam member upon rotation thereof, said cam elements on at least one of said cam members being rollers having surfaces engageable by cam elements on the other of said cam members which are perpendicular to the path of relative movement of said cam elements on the respective cam members.

2. In a device for simultaneously reciprocating and continuously rotating a tool, the combination of: a housing; a stationary cam member carried by said housing; a movable cam member carried by said housing and adapted to have the tool connected thereto, said movable cam member being rotatable and reciprocable relative to said stationary cam member; means for rotating said movable cam member; and interengageable rotatable cam elements on said cam members for reciprocating said movable cam member upon rotation thereof, said cam elements on one of said cam members being balls and said cam elements on the other of said cam members being rollers having surfaces engageable by said balls which are perpendicular to the path of relative movement of said balls and rollers.

3. In a device for simultaneously reciprocating and continuously rotating a tool, the combination of: a housing; a stationary cam member carried by said housing; a movable cam member carried by said housing and adapted to have the tool connected thereto, said movable cam member being rotatable and reciprocable relative to said stationary cam member; means for rotating said movable cam member; interengageable cam elements on said cam members for reciprocating said movable cam member upon rotation thereof, said cam elements on at least one of said cam members being balls; and adjustable seat means for said balls carried by said one cam member for moving said balls axially in directions generally parallel to the axis of rotation of said movable cam member.

4. In a rotary hammer, the combination of: two relatively rotatable cam members having transverse cam faces generally perpendicular to the axis of relative rotation thereof; rotatable rollers carried by one of said cam faces; and rotatable balls carried by the other of said cam faces and engageable with said rollers, said rollers having surfaces engageable by said balls which are perpendicular to the path of relative movement of said rollers and said balls.

References Cited in the file of this patent

UNITED STATES PATENTS

| 1,683,715 | Erban | Sept. 11, 1928 |
| 2,211,741 | Elwell | Aug. 13, 1930 |
| 2,326,136 | Garrett | Aug. 10, 1943 |
| 2,399,701 | White | May 7, 1946 |
| 2,399,702 | White | May 7, 1946 |
| 2,401,794 | Pratt | June 11, 1946 |
| 2,459,682 | Carrie | Jan. 18, 1949 |
| 2,484,471 | Shin | Oct. 11, 1949 |
| 2,514,759 | Hallden | July 11, 1950 |
| 2,521,900 | Clark | Sept. 12, 1950 |
| 2,628,503 | Messinger | Feb. 17, 1953 |
| 2,780,106 | Lovequist | Feb. 5, 1957 |